(12) United States Patent
Elrabaa

(10) Patent No.: US 8,351,489 B2
(45) Date of Patent: Jan. 8, 2013

(54) TWO-PHASE RETURN-TO-ZERO ASYNCHRONOUS TRANSCEIVER

(75) Inventor: Muhammad E. S. Elrabaa, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 884 days.

(21) Appl. No.: 12/457,337

(22) Filed: Jun. 8, 2009

(65) Prior Publication Data
US 2010/0309961 A1 Dec. 9, 2010

(51) Int. Cl.
*H04B 1/38* (2006.01)
(52) U.S. Cl. .. 375/219; 326/93; 340/12.37; 340/538.15; 341/69
(58) Field of Classification Search .................. None
See application file for complete search history.

(56) References Cited

U.S. PATENT DOCUMENTS

| | | |
|---|---|---|
| 3,652,986 A | 3/1972 | Monroe |
| 5,521,738 A | 5/1996 | Froberg et al. |
| 6,718,142 B1 | 4/2004 | Murai |
| 6,980,746 B2 | 12/2005 | Hayee |
| 2004/0046590 A1* | 3/2004 | Singh et al. ............... 326/93 |
| 2005/0007151 A1* | 1/2005 | Nystrom et al. .......... 326/93 |

FOREIGN PATENT DOCUMENTS

| | | |
|---|---|---|
| EP | 0769778 A1 | 4/1997 |
| JP | 3042913 A | 2/1991 |
| JP | 9294131 A | 11/1997 |
| KR | 20010063670 A | 7/2001 |
| KR | 20020048230 A | 6/2002 |
| RU | 2279181 C1 | 6/2006 |
| RU | 2291560 C1 | 1/2007 |
| WO | WO0167643 A2 | 9/2001 |

* cited by examiner

*Primary Examiner* — David C. Payne
*Assistant Examiner* — Adolf Dsouza
(74) *Attorney, Agent, or Firm* — Richard C. Litman

(57) ABSTRACT

A two-phase return-to-zero asynchronous transceiver is provided. The two-phase return-to-zero asynchronous transceiver is designed for on-chip interconnects. The transceiver includes a multi-stage transceiver arranged in a dual rail configuration, along with a weak keeper for each stage, a data driver for each stage, and an enable control circuit for selectively enabling the data driver, such that the data driver outputs data to a subsequent stage of the multi-stage transceiver. The enable control circuit further utilizes a handshaking protocol, which may be implemented at 0.13 μm and 1.2 Volts. The transceiver circuit achieves a throughput of approximately 3 Gb/s with wire lengths of approximately 100 μm.

8 Claims, 9 Drawing Sheets

TWO-PHASE RETURN-TO-ZERO ASYNCHRONOUS TRANSCEIVER

BACKGROUND OF THE INVENTION

1. Field of the Invention

The present invention relates generally to asynchronous on-chip communication, and more specifically, to a two-phase, return-to-zero (RZ) asynchronous transceiver for on-chip interconnects.

2. Description of the Related Art

Current integrated circuits (i.e., chips) not only feature multiple clock domains but also integrate a wide range of blocks (IPs) with various data communication needs and patterns. In addition, due to consumer demands, these designs have very short time-to-market demands. This requires efficient design flows that can achieve time closure of the whole chip in short times. As a result of these requirements two main new design paradigms have emerged to satisfy the communication needs of these chips while enabling a reasonable timing closure of the complete design: Network-on-chips (NoCs) and Globally Asynchronous Locally Synchronous (GALS) systems.

NoCs research aims at developing scalable interconnect architectures that can provide means for routing data between System on Chip (SoC) 1 Ps with minimum latency over shared interconnects. While research on GALS aims at developing circuits, methodologies and models for interconnecting synchronous blocks with separate clock domains using asynchronous interconnects. Hence NoCs can be viewed as a special case of GALS. In any case, both share the common problem of designing the point-to-point interconnect circuitry (repeaters, buffers, and pipeline stages) between routers and/or IP blocks. Hence developing high performance robust interconnect circuitry is essential for current and future chip designs.

GALS are categorized into pause-able clock GALS, asynchronous GALS, and loosely synchronous GALS, based on their communication schemes. Pause-able clock systems stop (or pause) the clock of the IP block during data transfer. This goes against the fundamental concept of decoupling 'computations' from 'communications' rendering this design style impractical. With each additional input channel, the percentage of idle time would increase even further. Loosely synchronous techniques would require some form of buffering (FIFOs) on the receiver and/or transmitter sides, again, coupling IP design with the communication (interconnect) design. This would increase the chip's design time significantly. Fully asynchronous interconnects offer the highest degree of robustness and decoupling of different chip design activities.

In a typical asynchronous pipeline, data is transferred from one stage to the next via a sequence of handshaking signals. A stage would latch a datum when it receives a Request (REQ) signal from the preceding stage while the next stage had already indicated that it had latched the previous datum (by de-asserting the Acknowledge signal). Traditionally, there have been two main handshaking protocols for asynchronous data exchange: four-phase handshaking and two-phase handshaking. When combined with dual-rail data encoding these protocols yield delay-insensitive (or at least Quasi-delay-insensitive) operation. A four-phase protocol uses a return-to-zero (RZ) data format requiring 4 steps (or trips) to complete a single datum transfer. The transmitter initiates a datum transfer by driving one of the pre-charged data lines low (or high depending on the pre-charged value). The receiver detects the difference between the data lines using a simple CMOS gate, generates the request, latches in the data if the acknowledge signal coming from the next stage is low and forces its own acknowledge high.

This signals the transmitter that the transfer is successful and it responds by pre-charging the data lines, the pre-charging being detected at the receiver as the request signal transitions down. The receiver now responds by lowering its acknowledge signal indicating to the transmitter that it is ready for a new data. Since data is level-encoded, conventional circuits can be used in the transmitter and receiver. The two-phase protocol is very similar except that it uses a non-return-to-zero (NRZ) data format (no pre-charging) requiring only two steps to complete a datum transfer. For this protocol, data is transition encoded, which requires special circuitry to detect and handle the two possible transitions. Latency and throughput are major concerns. Due to handshaking, each datum transfer would require at least two round trips. Interconnect pipelining and repeaters can improve latency and throughput.

Many researchers have proposed new solutions to improve latency and throughput of asynchronous pipelines. In some systems control pulses are used instead of traditional transition-coded control. This allows faster acknowledge at the expense of more complex circuit design to precisely control pulse widths and match the wire delays. Other researchers proposed a form of wave-pipelining called surfing interconnects where they remove two-way handshaking altogether. This adversely affects the robustness of circuits and increases the design time significantly. By trading off design time (complexity) for speed, flow control is sacrificed. Asynchronous handshaking not only ensures proper timing of valid data but it also allows receivers to control the flow of data, an essential feature in SoCs. Using FIFO buffers instead of handshaking would require flow control at higher levels of the protocol stack.

Surfing interconnects resemble source synchronous communications with the request signal being used to strobe the data at the receiver and repeaters with adjustable delays as delay lines. Efficient source synchronous on-chip serial communication circuits have been proposed wherein the data and clock are re-timed at the receiver side instead of repeaters along the control line. However, flow control would have to be handled at higher levels of the communication protocol stack, something that SoC Ws might not be designed for.

Another concern with asynchronous interconnects is the use of non-standard CMOS circuits. Hence, developing robust asynchronous circuits that can be used as 'plug-and-play' hard macros is highly desirable. This can be achieved through the use of delay-insensitive design techniques. What is needed is an interconnect system that achieves reasonably low latency, has a simple architecture, maintains RZ signaling protocol, and retains the robustness of delay-insensitive asynchronous circuits.

Thus, a two-phase return-to-zero asynchronous transceiver solving the aforementioned problems is desired.

SUMMARY OF THE INVENTION

The two-phase return-to-zero asynchronous transceiver is delay-insensitive and specifically designed for on-chip interconnects.

A handshaking protocol utilizes return-to-zero data format, thereby simplifying communication circuit's design significantly. Robust transceiver circuits that implement the return-to-zero data formatted handshaking protocol have been developed, and their performance has been verified using SPICE simulations with a 0.13 pm, 1.2V technology.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
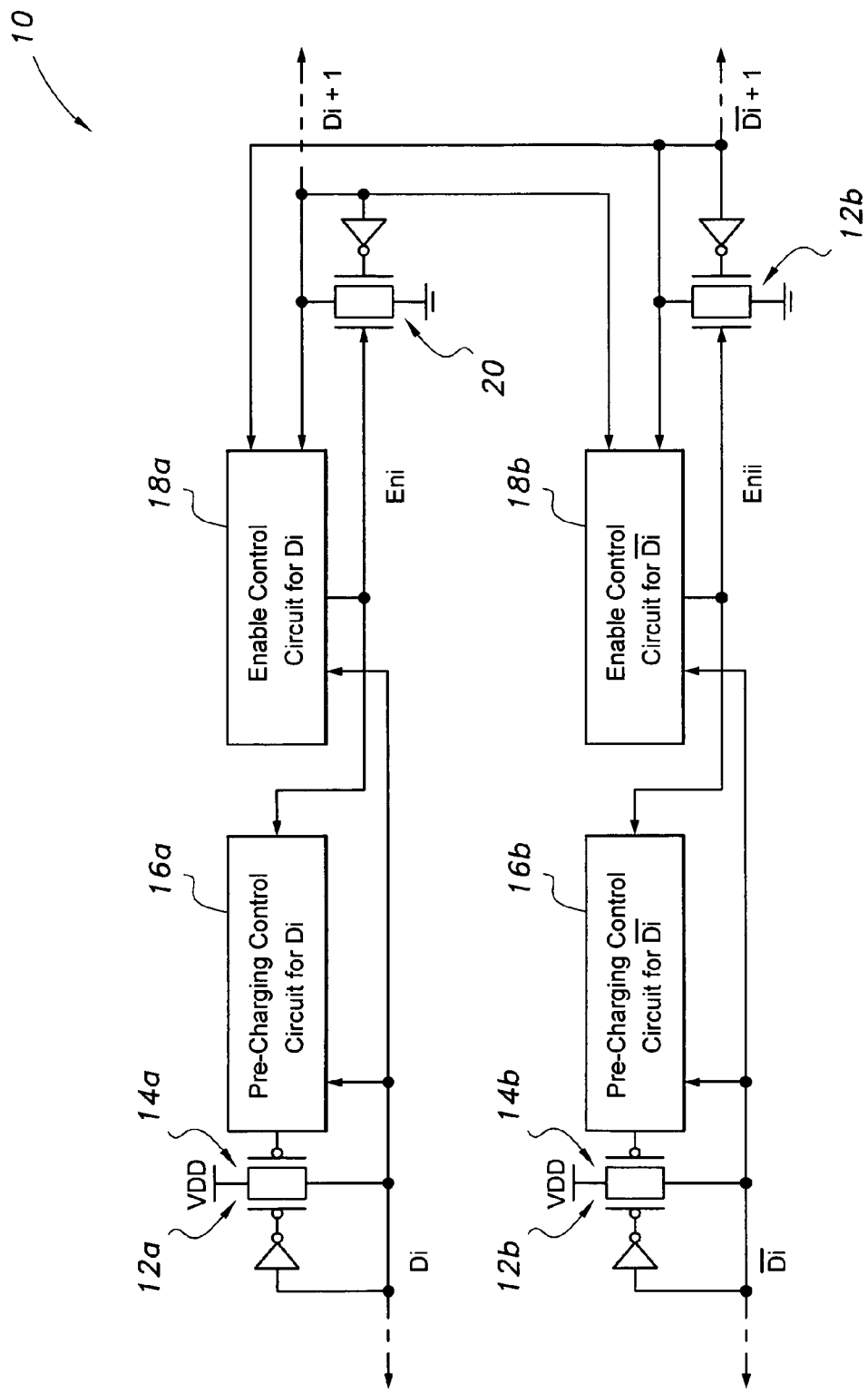
FIG. 1 is a block diagram of the two-phase return-to-zero asynchronous transceiver according to the present invention.

As shown in FIG. 1, the two-phase return-to-zero asynchronous transceiver 10 is delay-insensitive and specifically designed for on-chip interconnects. A handshaking protocol utilizes return-to-zero data format, thereby significantly simplifying the design of communication circuits. Robust transceiver circuits that implement the return-to-zero data formatted handshaking protocol have been developed, and their performance has been verified using SPICE simulations with a 0.13 pm, 1.2V technology.

Figure 4:
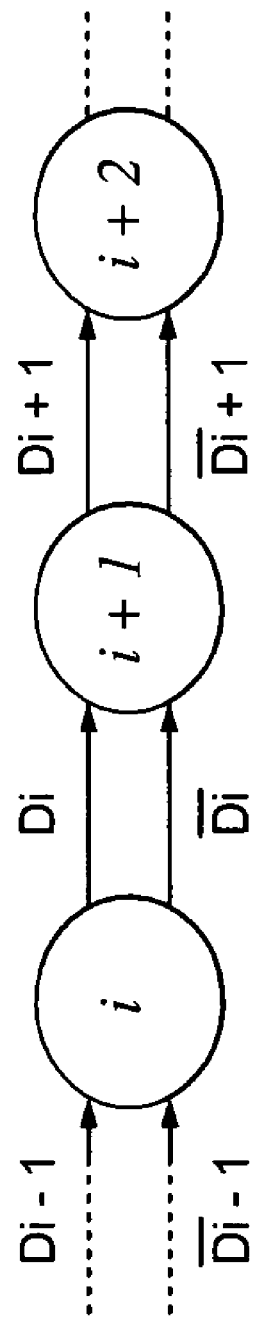
FIG. 4 is a block diagram showing two-phase handshaking in a two-phase return-to-zero asynchronous transceiver according to the present invention.
Figure 5:
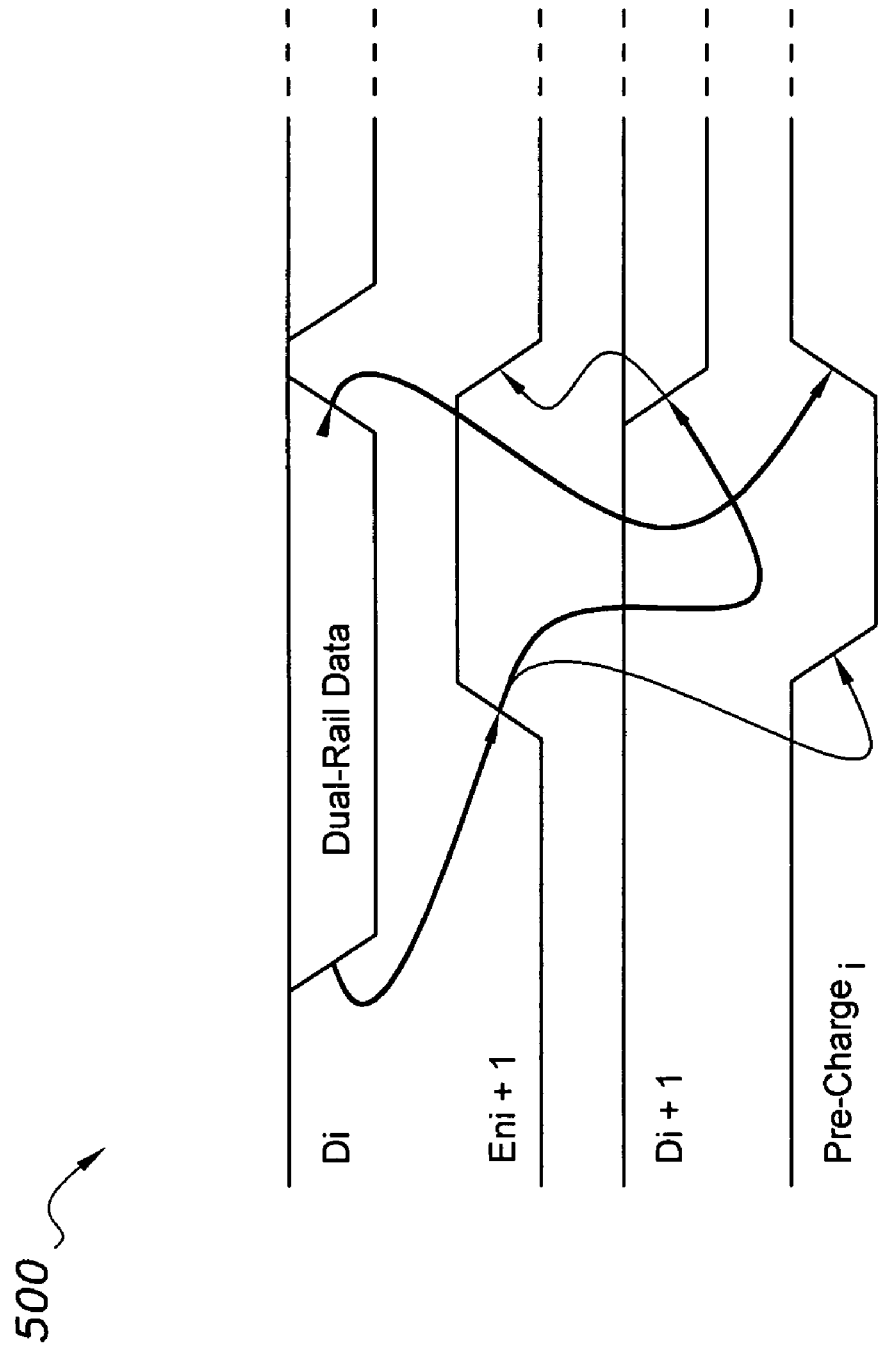
FIG. 5 is a flow diagram showing data flow through of a two-phase return-to-zero asynchronous transceiver according to the present invention.

As shown in FIGS. 4 and 5, both request and acknowledge signals are generated at the receiver of transceiver stages 400, and that the handshake protocol combines the four-phase data level-encoding (i.e., RZ) with the two-phase data exchange steps (trips), as detailed in the data transfer step plot 500. When a new data initiated at stage i is received at stage i+1, an enable signal is generated at stage i+1($En_{i+1}$). This enable signal initiates the transfer of data to the next segment ($i_+1^{th}$ segment), and at the same time activates a pre-charging signal (Pre-Charge) that pre-charges the preceding data segment, (the $i^{th}$ segment). The transfer of data is overlapped to the $i+1^{th}$ segment with the pre-charging of the $i^{th}$ segment. The data is transferred within two trips, similar to conventional two-phase signaling. Moreover, because data lines are pre-charged between transfers, simple level-sensitive circuits can be used, thus significantly reducing the circuit complexity while enabling higher performance. Also, since a data line can only go down, i.e., transition low, there is no need for an actual data latch. The enable signal can be simply used to drive the data line low using a single NMOS switch, thereby simplifying the design and reducing the latency of the repeater. Hence each data segment in the pipeline is discharged from the transmitter side and charged from the receiver side. The developed protocol and circuits ensure delay-insensitive operation with no contention between the discharging and charging circuitry on the same data segment.

As shown in FIG. 1, the transceiver circuit is illustrated to detail the repeater (transceiver) on one of the dual data lines. The circuit for the other line is similar, with Di replaced by Di− and Di+1 by Di+1−. The circuit comprises a data driver 20 for the next data segment, an enable control circuit 18a generating control signal (En;) as input to the data driver 20, a pre-charging driver 14a for the preceding data segment, and a pre-charging control circuit 16a, which controls the pre-charging driver 14a.

Figure 2:
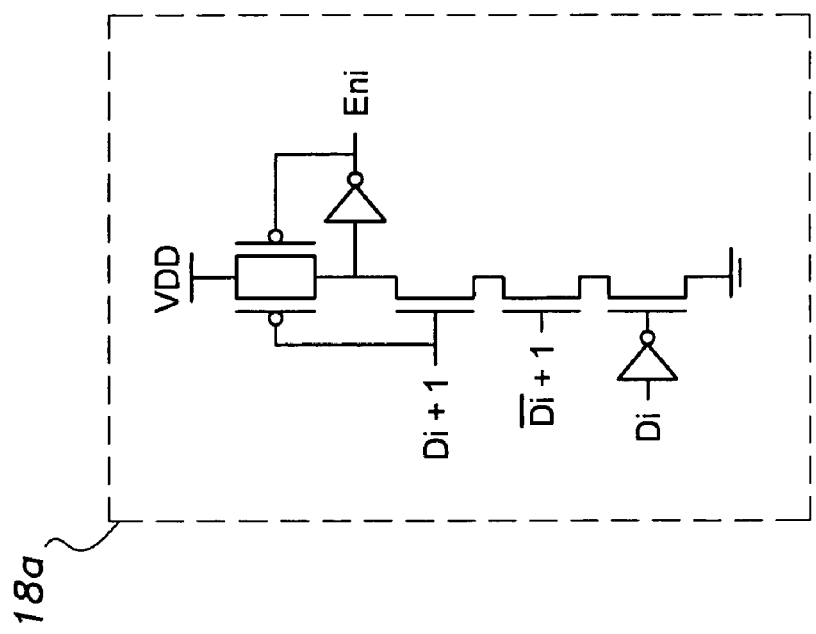
FIG. 2 is a detailed block diagram of the enable control circuit of a two-phase return-to-zero asynchronous transceiver according to the present invention.

The data driver circuit 20 is a simple NMOS switch with a weak keeper, i.e., a weak latch 12a to hold the data line low when the enable signal transitions low. As most clearly shown in FIG. 2, the enable control circuit 18a is structurally arranged and has behavior similar to a Muller-C element, i.e., enable control circuit 18a is well suited for asynchronous logic and has hysteresis. Control circuit 18a asserts the enable signal only when the input data ($D_i$) becomes low while both output data lines are high (indicating that previous data has been transferred). Only when the next data segment ($D_{i+1}$) is discharged can the $En_i$ signal be de-asserted. $En_i$ remains low as long as the next segment is low. A weak keeper is added to hold the enable signal low when all data segments are in the pre-charged (high) state.

Figure 3:
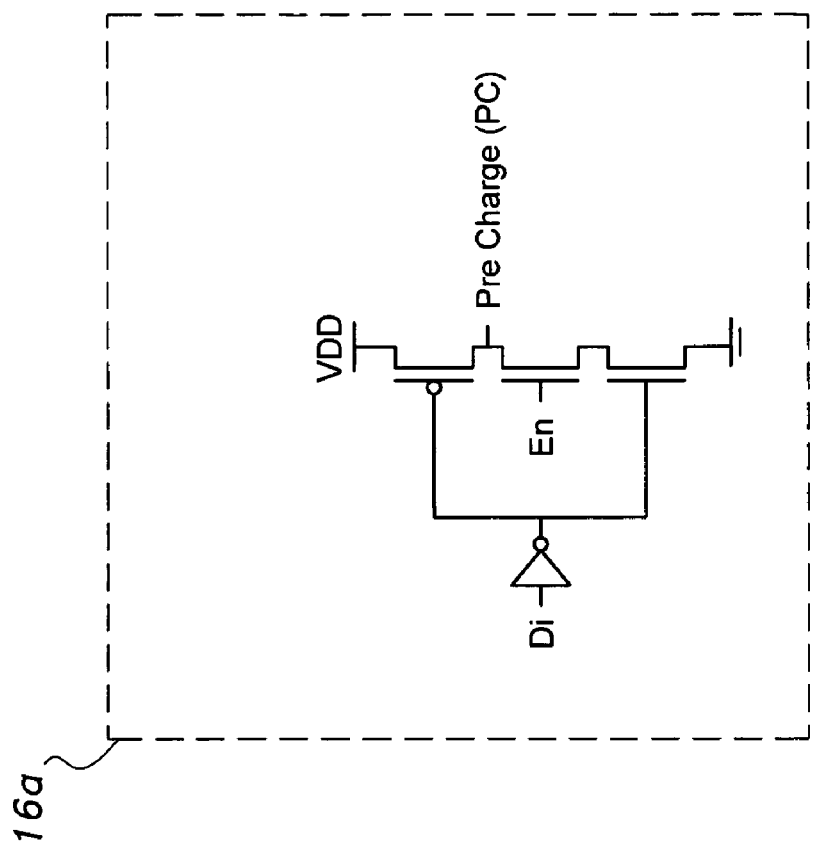
FIG. 3 is a detailed block diagram of the pre-charging control circuit of a two-phase return-to-zero asynchronous transceiver according to the present invention.

As shown in FIG. 1, the pre-charging driver 14a for the preceding data segment is a simple PMOS transistor and a weak keeper 12a to hold the data line high. As shown in FIGS. 1 and 3, the pre-charging control circuit 16a that controls the pre-charging driver 14a produces a low signal when both $En_i$ and $D_i$ are low. When the preceding segment is charged (i.e. $D_i$ becomes high), the pre-charging signal goes high and the data line is held high by the weak keeper 12a.

Unlike previous work, the widths of the $En_i$ and pre-charge pulses are automatically set by the timing behavior of the data lines and need no special circuit sizing.

Figure 6:
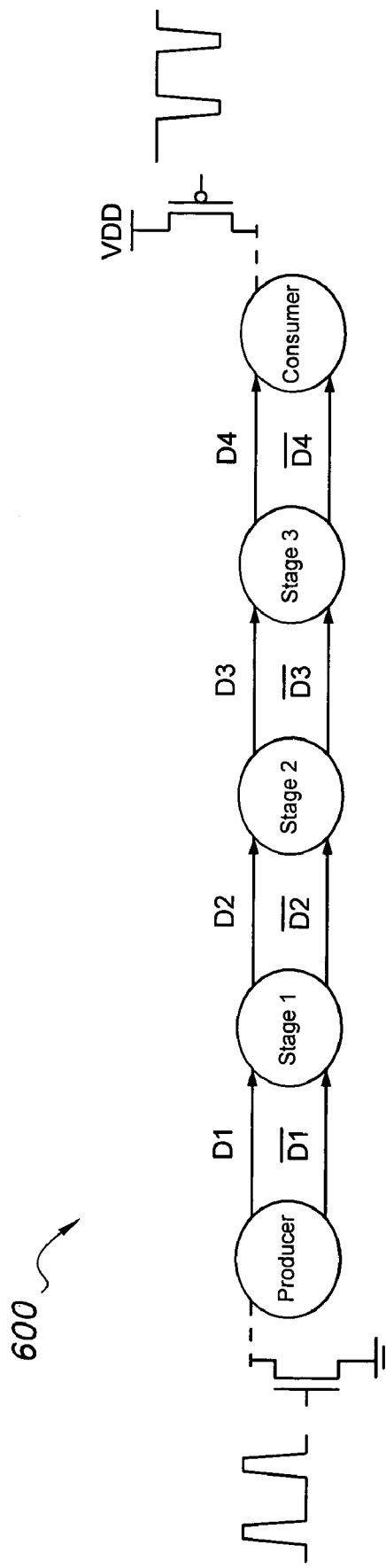
FIG. 6 is a block diagram showing a test setup for a two-phase return-to-zero asynchronous transceiver according to the present invention.
Figure 7:
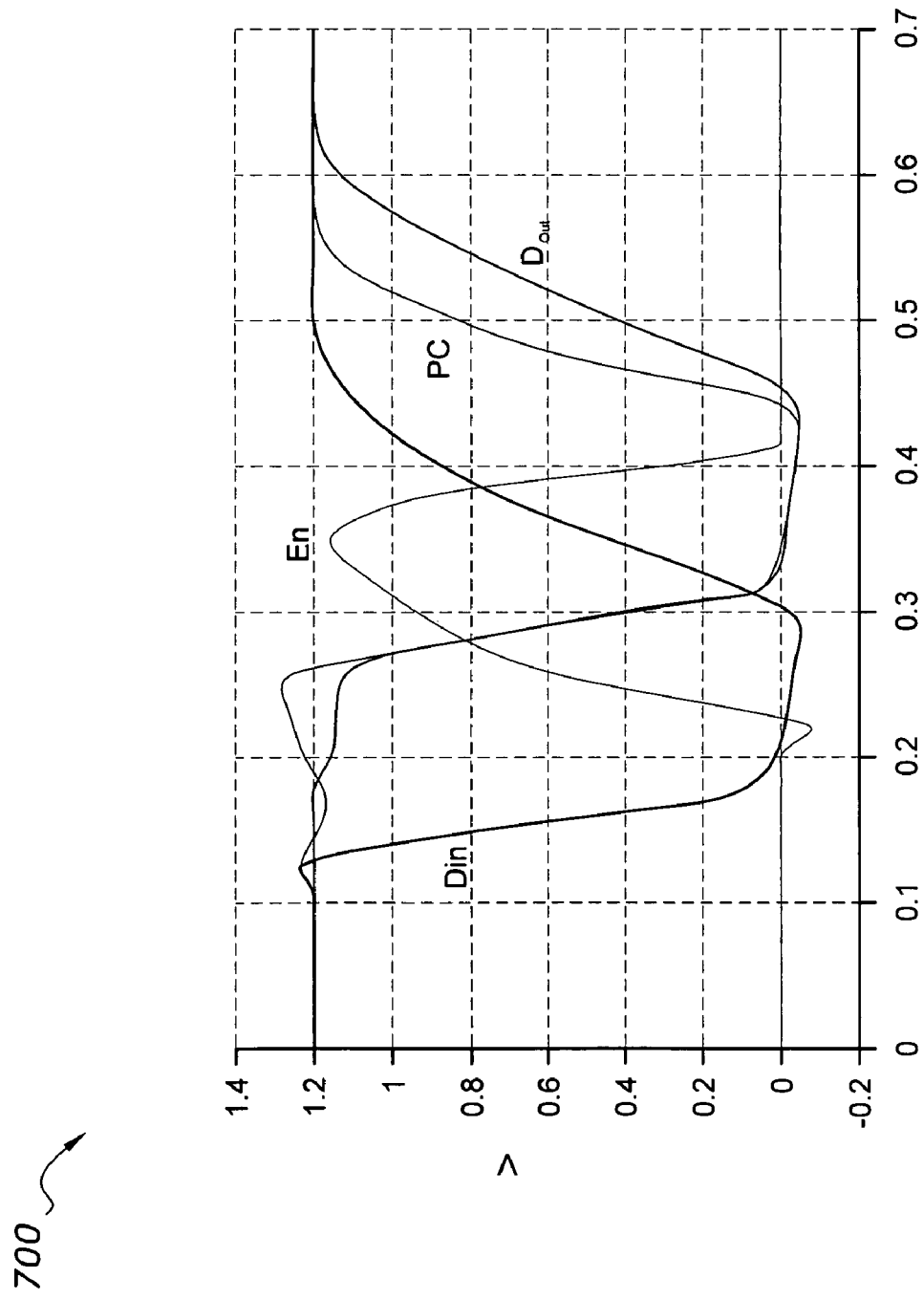
FIG. 7 is a plot showing signal waveforms of one of the transceiver stages of a two-phase return-to-zero asynchronous transceiver according to the present invention.

SPICE simulations using a 0.13 pm, 1.2 V CMOS technology were used to verify the operation of the new transceiver circuits. FIG. 6 shows the test setup that is a pipeline 600 consisting of three stages of asynchronous transceivers, a data producer and a data consumer. Wire segments in between are modeled using lumped RC circuits that approximately represent 100 μm wires. Transistors were sized to achieve 50 ps fall times and 100 ps rise times. No further optimization was carried out to illustrate the robustness of the circuits. FIG. 7 shows the simulation waveforms 700 of a single stage transceiver. It shows how the transceiver circuits achieve the appropriate sequence of events on input data, $En_i$ and pre-charge signals, and output data.

Figure 8:
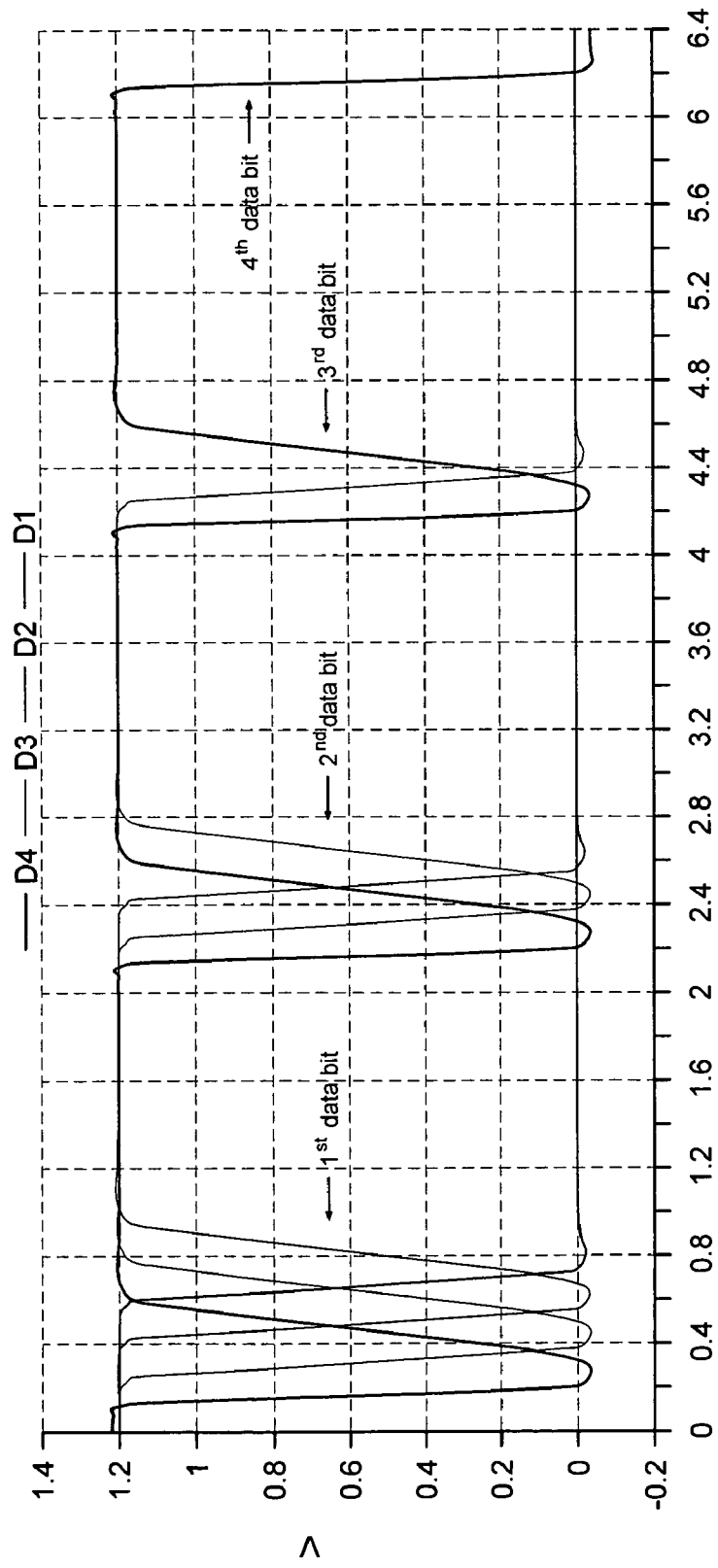
FIG. 8 is a plot showing Data Injection Rates versus Data Consumption Rates for a two-phase return-to-zero asynchronous transceiver according to the present invention.

To test the complete asynchronous pipeline the following scenario has been simulated. First, the producer produces data at a constant rate (every 2 ns), while the consumer does not consume any data, as shown in plot 800 of FIG. 8. Plot 800 indicates how the pipeline is filled after the injection of 4 data items (all data lines D1-4 are now low). After four data injections the pipeline is full and cannot accept any new data.

Figure 9:
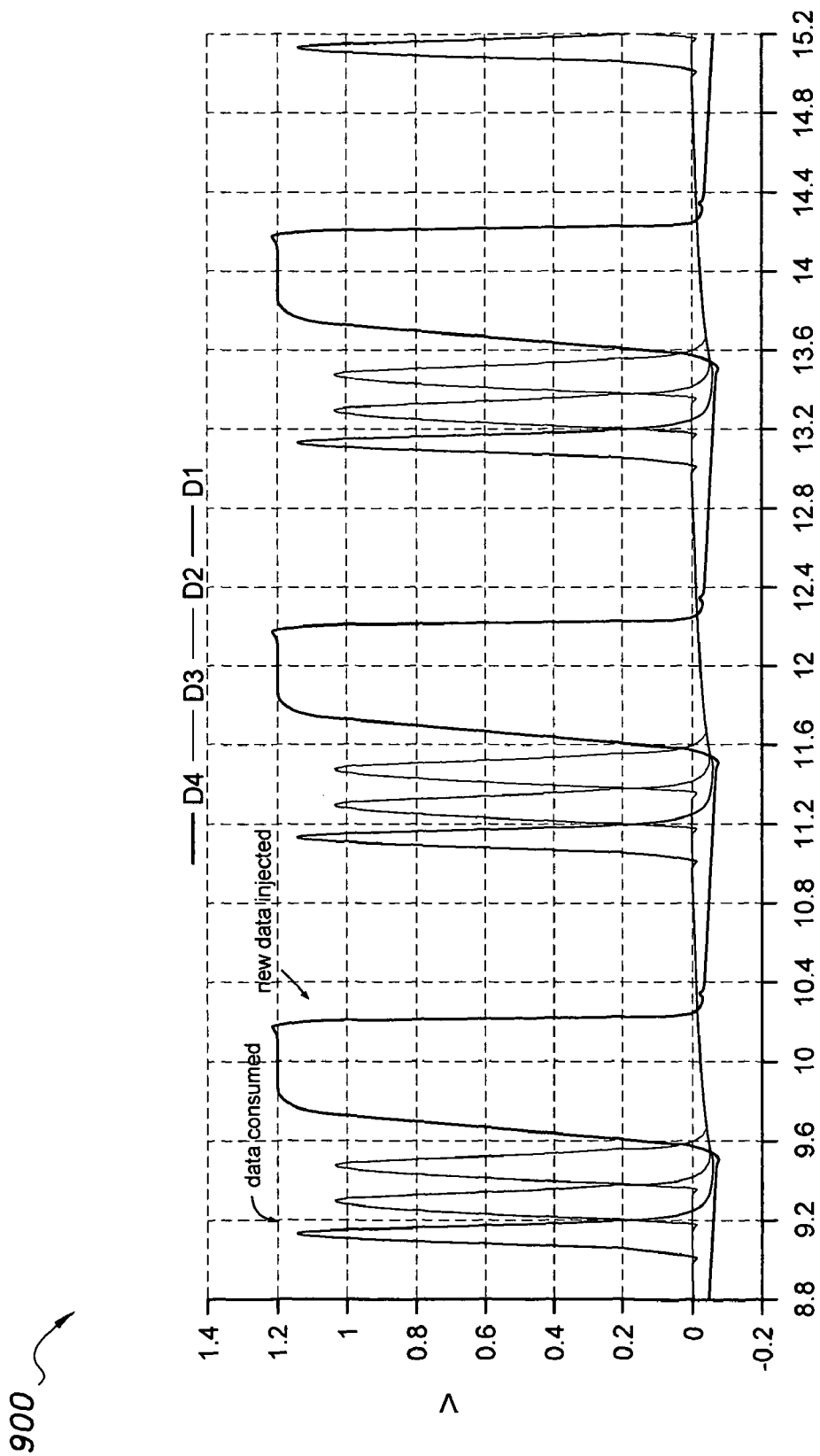
FIG. 9 is a plot showing Data Injection Rate versus Data Consumption Rate=2 ns in a two-phase return-to-zero asynchronous transceiver according to the present invention.

Next, as shown in plot 900 of FIG. 9, the consumer starts consuming data items also at a rate of 2 ns. The data is moving along the pipeline at a speed of approximately) 10 ps/stage.

Figure 10:
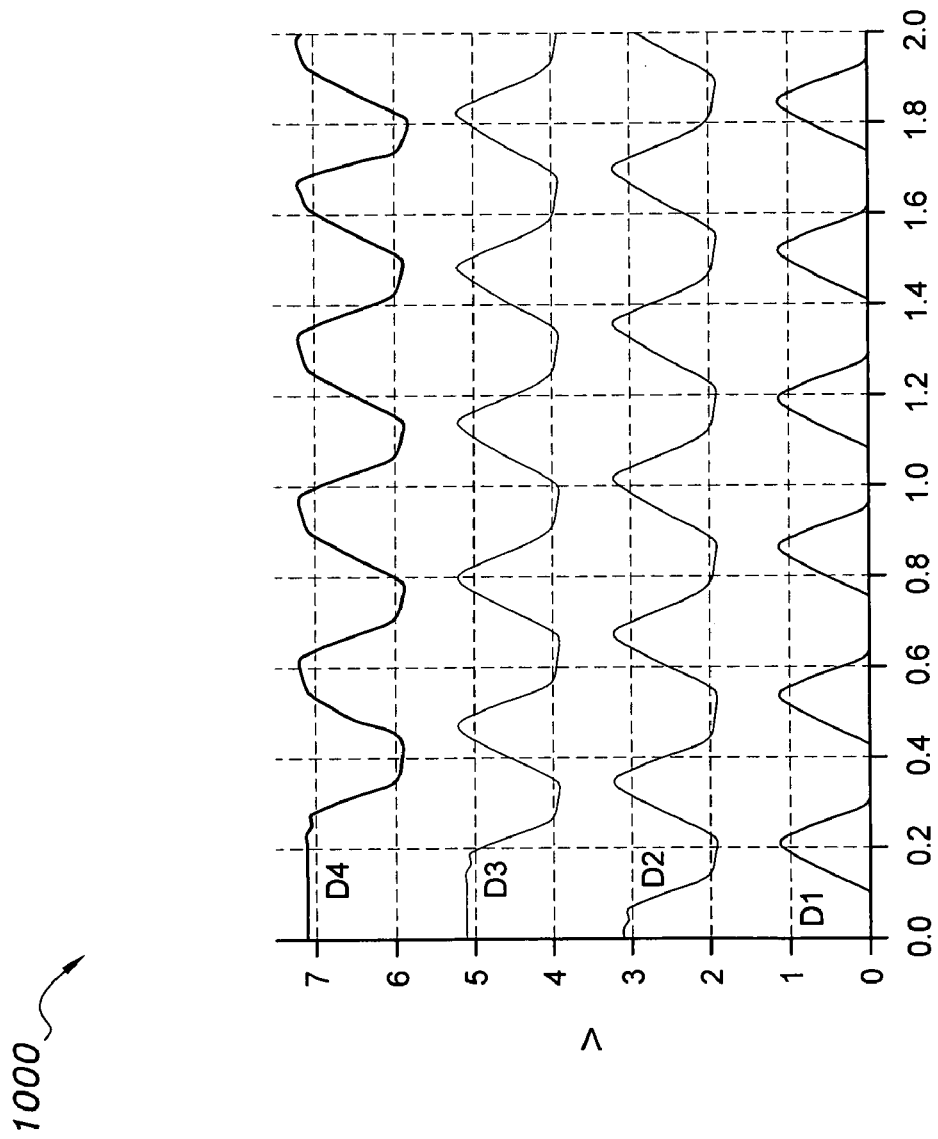
FIG. 10 is a plot showing maximum possible data injection rate with 100-turn wire segment length in a two-phase return-to-zero asynchronous transceiver according to the present invention.

Whenever the consumer consumes a data item (indicated by the pre-charging of D4), all the data in the pipeline moves one step forward as evident from the consecutive pre-charging and discharging of the data lines. The producer continues to inject data at the same rate the consumer is consuming them, keeping the pipeline full while data moves along the pipeline. The 2 ns injection/consumption rate was used to have uncluttered waveform graphs that clearly show the movement of data along the pipeline. Plot 1000 of FIG. 10 shows the data waveforms at a maximum injection rate of approximately 3 Gb/s. The waveforms have been shifted by 2V (starting with D1 at the bottom) for the sake of clarity. The circuit 10 still operates reliably at the 3 Gb/s rate.

A new two-phase asynchronous handshaking protocol that utilizes dual-rail RZ data encoding has been developed. It combines the best of the two worlds, two-phase handshaking with its low latency overhead, and return-to-zero signaling with its simple and efficient circuit realization. This results in simple yet robust circuit implementation that minimizes latency. The realized circuits have been tested using SPICE simulations and a 0.13 pm 1.2V technology. With almost no circuit optimization, the new transceiver circuit can achieve a throughput of 3 Gb/s with wire lengths of approximately 100 pm. The robustness and delay-insensitivity of the circuitry 10 aids in decoupling computations from communications in the System on Chip (SoC) design process thereby significantly increasing the design productivity.

It is to be understood that the present invention is not limited to the embodiment described above, but encompasses any and all embodiments within the scope of the following claims.

I claim:

1. A two-phase return-to-zero asynchronous transceiver, comprising:
   a multi-stage transceiver arranged in a dual rail configuration;
   a weak keeper for each stage, the weak keeper selectively latching data output of a previous stage, each of the rails including a pre-charging control circuit for a current stage, the pre-charging control circuit selectively applying charge to the pre-charging driver;
   a data driver for each of the stages; and
   an enable control circuit for each of the stages, the enable control circuit selectively enabling the data driver, the data driver outputting data to a subsequent stage of the multi-stage transceiver, wherein the enable control circuit includes handshaking protocol means for generating an enable signal at stage i+1 whenever new data initiated at stage i is received at stage i+1, thereby initiating transfer of data to the $i^{th}$ segment contemporaneously with activating a pre-charging signal for pre-charging the preceding ($i^{th}$) data segment.

2. The two-phase return-to-zero asynchronous transceiver according to claim 1, further comprising means for ensuring delay-insensitive circuit operation with no contention between discharging and charging circuitry on the same data segment.

3. The two-phase return-to-zero asynchronous transceiver according to claim 1, further comprising means for discharging each data segment from the transmitter side while pre-charging each data segment from the receiver side, thereby requiring only two steps to effectuate a datum transfer.

4. The two-phase return-to-zero asynchronous transceiver according to claim 1, wherein the data driver comprises means for holding a data line low when the enable signal transitions to a low state.

5. The two-phase return-to-zero asynchronous transceiver according to claim 1, wherein the enable circuit provides asynchronous logic operations with hysteresis.

6. The two-phase return-to-zero asynchronous transceiver according to claim 1, wherein the pre-charging driver for the preceding data segment includes a weak keeper to hold the data line high.

7. The two-phase return-to-zero asynchronous transceiver according to claim 1, wherein the widths of the enable signal pulses and the pre-charge signal pulses are automatically set by the timing behavior of the data lines, thereby obviating the need for specialized circuit sizing.

8. The two-phase return-to-zero asynchronous transceiver according to claim 7, wherein the transceiver circuit achieves a throughput of approximately 3 Gb/s with wire lengths of approximately 100 μm.

* * * * *